(No Model.) 2 Sheets—Sheet 1.

C. A. SIMPSON.
VEHICLE WASHING DEVICE.

No. 543,709. Patented July 30, 1895.

WITNESSES:

INVENTOR:
Charles A. Simpson
Attorneys (No Model.) 2 Sheets—Sheet 2.
C. A. SIMPSON.
VEHICLE WASHING DEVICE.

No. 543,709. Patented July 30, 1895.

WITNESSES: INVENTOR:
Charles A. Simpson

UNITED STATES PATENT OFFICE.

CHARLES A. SIMPSON, OF SARATOGA SPRINGS, NEW YORK.

VEHICLE-WASHING DEVICE.

SPECIFICATION forming part of Letters Patent No. 543,709, dated July 30, 1895.

Application filed November 9, 1894. Serial No. 528,281. (No model.)

*To all whom it may concern:*

Be it known that I, CHARLES A. SIMPSON, a citizen of the United States, and a resident of Saratoga Springs, in the county of Saratoga and State of New York, have invented certain new and useful Improvements in Vehicle-Washing Devices; and I do hereby declare that the following is a full, clear, and exact description of the invention, which will enable others skilled in the art to which it appertains to make and use the same, reference being had to the accompanying drawings, which form a part of this specification.

My invention relates to improvements in devices to be used in stables and other places for washing carriages and other vehicles; and it consists essentially of two horizontal pipes adapted to have a hose connected thereto, of a supply-pipe, suitable brackets, and a series of T's, couplings, nipples, and an expansion-joint, so constructed and arranged that said pipes may be rotated and revolved in a horizontal plane, so that a stream of water may be directed to any side of the vehicle, thereby avoiding the necessity of dragging the hose over the floor, which would tend to injure and wear out the same.

Figure 1:
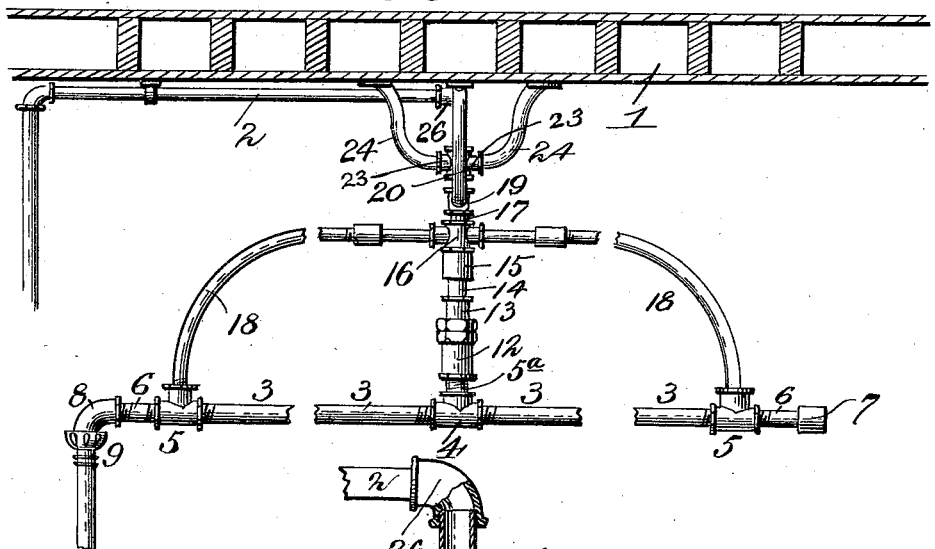
Figures 2, 4:
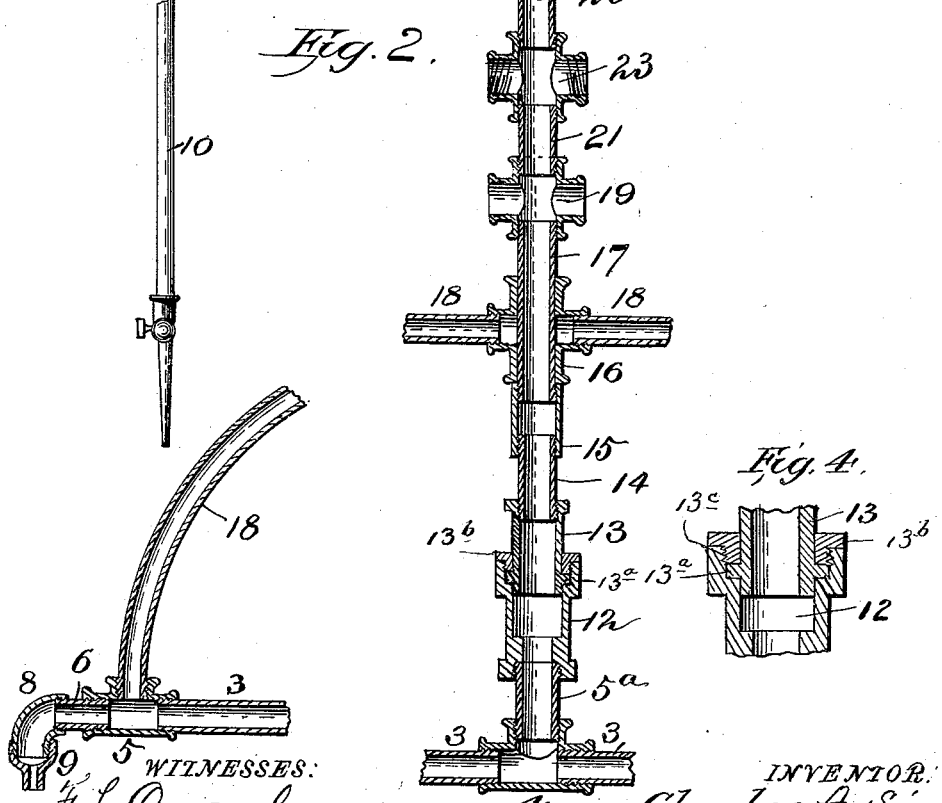
Figure 3:
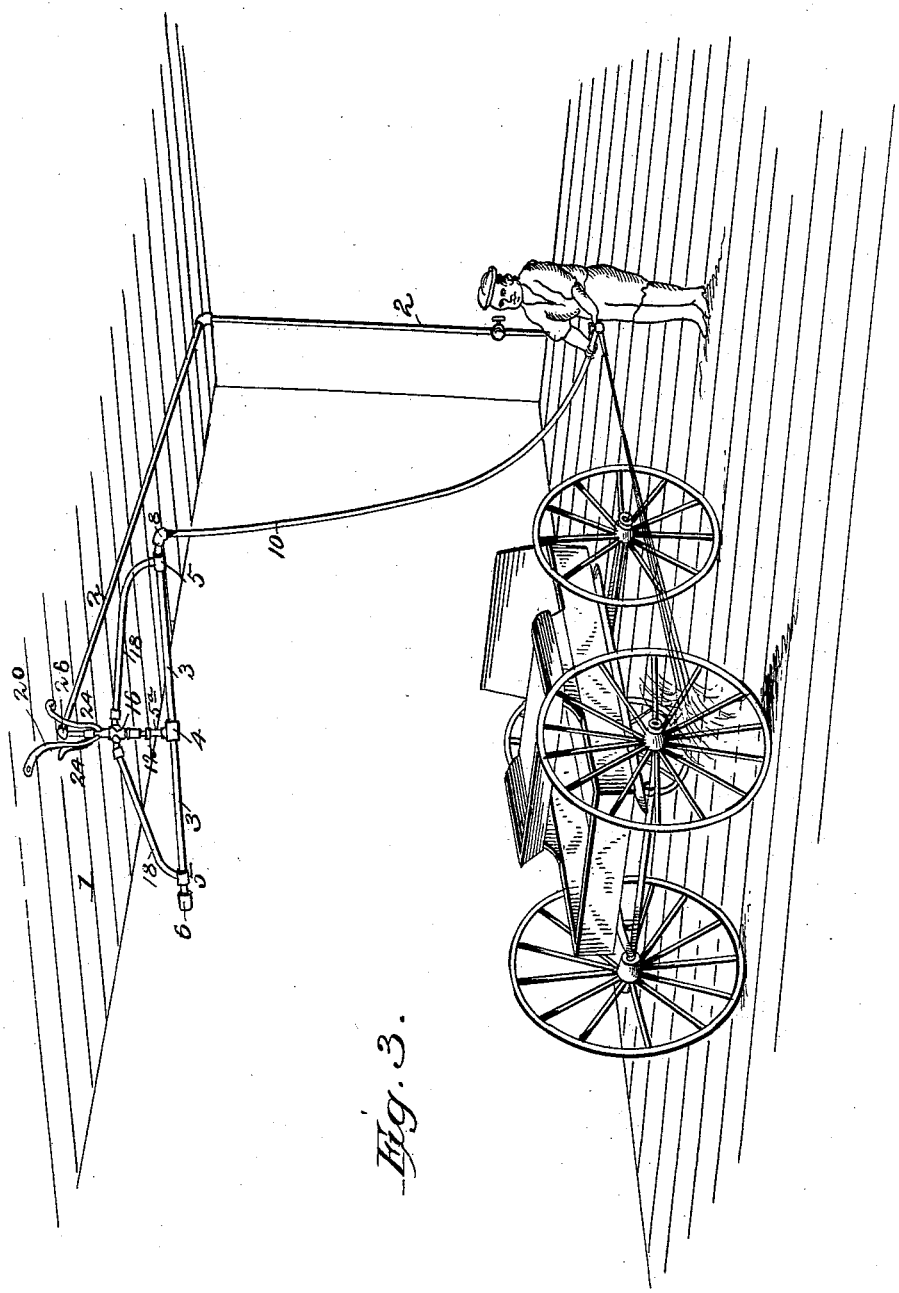

In the accompanying drawings, Figure 1 is a side elevation of a washing device constructed in accordance with my invention. Fig. 2 is a central longitudinal section of a part of the same. Fig. 3 is a perspective view showing the device in operation. Fig. 4 is a detail sectional view of the expansion-joint.

In the said drawings the reference-numeral 1 designates the ceiling of a stable or other structure, to which is secured a water-supply pipe 2, connected with any suitable source.

The numeral 3 designates two horizontal pipes, the inner ends of which are connected with a T 4, and their outer ends provided with a T 5, with which are connected nipples 6. One of these nipples is provided with a removable cap 7, while the other is provided with an elbow 8 and a nipple 9 with a hose-thread on one end with which is connected a hose 10. Connected with the T 4 is a nipple $5^a$, to which is secured the lower section 12 of a two-part expansion-joint, the upper end of which section is formed with a screw-threaded recess.

The numeral 13 designates the upper section formed near its lower end with an annular collar 13, which fits in the unthreaded portion of the recess in said lower section. The upper section is provided with a rotatable collar $13^b$, having a screw-threaded boss $13^c$, which engages with the threaded upper end of the lower section. It will thus be seen that the lower section 12 is rotatable on the upper section. To this upper section is secured a nipple 14, which in turn is secured to a coupling 15, the upper end of which forms a seat for a cross 16, which loosely embraces a nipple 17, secured to said coupling 15. With this cross are connected two curved pipes or rods 18, the lower ends of which are connected with the T's 5.

The numeral 19 designates a cross connected with nipple 17 and provided with a bracket 20, the upper end of which is secured to the ceiling of the stable. This cross is connected by a nipple 21 with a similar cross 23, provided with brackets 24, which are also secured to the ceiling.

The numeral 25 designates a nipple, and 26 an elbow connecting the supply-pipe 2 with cross 23.

The operation will be readily understood. Water is carried from the supply-pipe down through the crosses, nipples, couplings, T's, and expansion-joint to the T 4, and from thence through one of the pipes 3 to the hose, which is provided with a suitable pipe and stop-cock, as is usual. By the construction shown cross 16 and the lower section of the expansion-joint can rotate respectively on the nipple 17 and the upper section 13, so that the pipe 3 and the hose can be revolved around the vehicle and the water from the hose directed to any point desired. The hose need only be long enough to reach the floor, so that it will not drag thereon when moving around the vehicle.

Having thus fully described my invention, what I claim is—

In a vehicle washing device, the combination with the horizontal pipes connected together by a T at their inner ends, one of which pipes is provided with a cap and the other with a hose, and the nipple connected with said T, of the two part expansion joint connected with said nipple, the lower section of which is formed with a screw threaded recess, the upper section provided with an annular flange and a rotatable collar having a screw threaded boss engaging with the lower section, the nipple and coupling connected with said upper section, the nipple connected with said coupling, the rotatable cross, the rods or pipes connected therewith and with said horizontal pipes, the crosses and nipples above said rotatable cross, the brackets connected with said crosses and secured to the ceiling of a stable or other structure, and the supply pipe, substantially as described.

In testimony that I claim the foregoing as my own I have hereunto affixed my signature in presence of two witnesses.

CHARLES A. SIMPSON.

Witnesses:
ELMER E. BELCHER,
FRANK M. JENKINS.